April 4, 1950 F. D. SNYDER Re. 23,217

CONTROL CIRCUITS

Original Filed Sept. 7, 1944

WITNESSES:

C. J. Weller.

Curtis M. Avery

INVENTOR

Frederick D. Snyder.

BY

Paul E. Friedemann

ATTORNEY

Reissued Apr. 4, 1950

Re. 23,217

UNITED STATES PATENT OFFICE 23,217

CONTROL CIRCUITS

Frederick D. Snyder, Milton, Mass., assignor to Westinghouse Electric Corporation, East Pittsburgh, Pa., a corporation of Pennsylvania Original No. 2,445,459, dated July 20, 1948, Serial No. 553,034, September 7, 1944. Application for reissue July 21, 1949, Serial No. 106,080

6 Claims. (Cl. 175—335)

Matter enclosed in heavy brackets [ ] appears in the original patent but forms no part of this reissue specification; matter printed in italics indicates the additions made by reissue

My invention relates to electromagnetic apparatus which embody a holding magnet, and more particularly to electric control circuits for magnetizing and demagnetizing the holding magnets of chucks or retentive relays and the like magnetic devices.

Electromagnetic chucks, as used on machine tools, have a holding magnet inductively associated with magnetizing coils which, when energized, induce sufficient magnetism to firmly attach a magnetizable workpiece to the pole surface of the chuck as long as the energizing current continues to flow. Upon interruption of this current, the residual magnetism of magnet and workpiece is apt to maintain a magnetic flux strong enough to prevent taking the workpiece off the chuck. Therefore, a pole-changing demagnetizing switch is usually provided so that the operator, by quick and expert maneuvering, is able to put just enough reverse power into the chuck to cancel the residual flux. This requires appreciable skill as the demagnetizing switch must be teased back and forth until the operator strikes a point where the magnetic circuit is approximately fully demagnetized. Similar conditions exist with pickup and hoisting magnets as used on cranes.

It is an object of my invention to provide control means for electromagnetic chucks and the like magnetically retentive holding magnets which facilitate demagnetizing the retentive circuit and eliminate trial and error methods of the above-mentioned kind so that no particular skill is necessary for releasing the magnetic grip.

In electromagnetic contactors for electric control circuits, the retentive induction (remanence) of a magnetic circuit, formed by a stationary fieldpiece and a movable armature, has been utilized for holding the contactor in picked-up condition once the fieldpiece has been magnetized by a temporary electric current excitation. A direct-current of reverse polarity or an alternating current of low amplitude is usually applied in order to release the contactor by reducing the attractive force of its residual magnetism below that required for overcoming the opening tendency of the armature bias. Referring to such contactors, it is also an object of my invention to provide simple and reliable demagnetizing or release means; and it is a further object relating to such contactors to devise demagnetizing circuits that permit obtaining a desired timing or delay of the release performance.

In order to achieve these objects, and in accordance with my invention, I provide an electric holding magnet of the type referred to with a capacitor which is charged previous to the release operation and which is caused to pass a demagnetizing discharge through the magnet coils for canceling or reducing the residual magnetism of the holding magnet. The capacitor and coil circuit is so rated as to produce a demagnetizing effect sufficient to eliminate the residual flux in one or a few successive discharge operations.

According to another feature of the invention the control circuit of a holding magnet is equipped with a control switch whose operation, when releasing the magnet, causes a capacitor to be charged and discharged twice or several times so that the integral effect of the several discharges results in the desired demagnetization. According to still another feature, related to the one just mentioned, each subsequent charge imposed on the capacitor is caused to flow through the magnetizing coils of the holding magnet in the direction opposite to the original magnetizing current so as to contribute also to reducing the residual induction.

In still another aspect of my invention, I provide charging means for the above-mentioned capacitor which include a potentiometric circuit so as to permit a desired adjustment of the charging voltage of the capacitor or a change of this voltage in accordance with the particular requirements of each case of application.

In conjunction with any of the features mentioned in the foregoing and in accordance with a further essential point of the invention, the capacitor for issuing a demagnetizing current is so rated relative to the coils of the magnet that it forms an oscillatory system therewith with the effect of producing an alternating discharge current of a substantially given frequency and attenuation.

Lastly, it is also a feature of the invention to apply a capacitor discharge, in the manner referred to in the foregoing, to an electromagnetic contactor of the retentive type so that demagnetization of the relay involves a rated or metered timing effect which imparts to the relay the characteristic of a timing device.

These objects and features of the invention will be apparent from the following description of the embodiments illustrated in the drawing in which.

Figure 1:
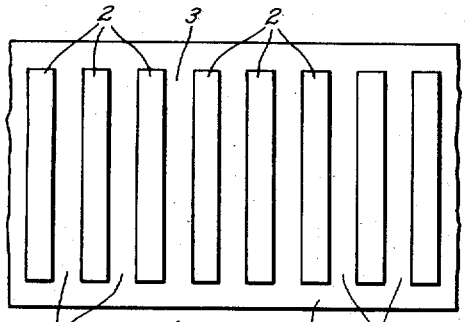
Figure 1 shows a top view of part of a holding magnet appertaining to an electromagnetic chuck, the coils of the magnet being omitted in this illustration.
Figure 2:
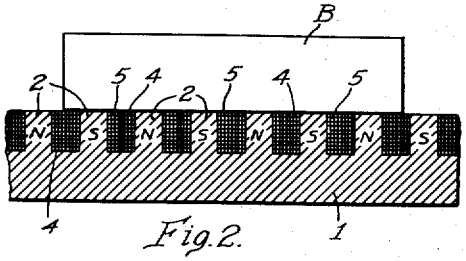
Fig. 2 is a diagrammatic showing of a section through the holding magnet shown in Fig. 1 and indicates also the appertaining coils.

Referring to Figs. 1 and 2, the illustrated holding magnet is chosen as representative of a large variety of available chucks. The chuck, as shown, is intended for a machine tool in which the body 1 of the magnet is mounted on a reciprocating machine portion for carrying a workpiece along a stationary tool. However, a similar chuck may also be used as a stationary machine part for holding a workpiece relative to a movable tool; and it will also be understood that the principles of my invention are likewise applicable to chucks of the rotating type such as used on lathes. The body 1 of the holding magnet is provided with spaced projections 2 forming between them a series of grooves 3. The grooves 3 are provided with coils denoted by 4 and 5. These coils are all connected with one another and so wound that the projections 2 form alternating north and south poles as is indicated in Fig. 2 by the letters "N" and "S," respectively. The top surfaces of the projections 2 form the supporting surface for the workpiece B of magnetizable material. When the chuck windings are energized, the magnetic flux issuing from each north pole to the adjacent south poles passes through the workpiece B and produces sufficient attraction to hold the workpiece firmly against the chuck. This holding force obtains as long as the energizing direct current passes through the coils. Upon interruption of the current, the attractive force is reduced. However, the remanent magnetic induction of the holding magnet 1, or of the workpiece B, or both, remains, as a rule, sufficient to prevent lifting the workpiece from the chuck. Hence, it is necessary to apply a demagnetizing force to the magnet. This is also desired in cases where the persistence of an appreciable remanent magnetism in the workpiece B after its removal from the chuck is undesirable.

Figure 3:
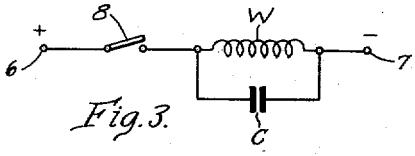
Fig. 3 is a control circuit according to the invention for operating a holding magnet as shown in Figs. 1 and 2.

The control circuit of coils 4 and 5 is schematically shown in Fig. 3. In this figure, the totality of coils is represented schematically by a single winding W. This winding is connected to direct-current terminals 6 and 7 through a single-pole on-and-off contact. A capacitor C is connected across the winding W. This capacitor C is so rated relative to the winding W that a charge impressed on the capacitor by the line voltage suffices to store sufficient energy for demagnetizing the winding. When switch 8 is closed the winding W is energized and induces in the chuck the magnetism necessary for firmly attaching the workpiece. Switch 8 remains closed as long as the chuck is in operation. During the closure of switch 8, the capacitor C collects a charge. When the switch 8 is opened thereby interrupting the magnetizing current, the capacitor discharges itself through winding W. The discharge may occur as represented by the voltage-time curve D in Fig. 6. As long as switch 8 is closed the voltage across the capacitor C is at its maximum value E. At the moment of interruption, denoted by T1 in Fig. 6, the capacitor begins issuing its charge through winding W. The winding and capacitor form an oscillatory system so that the discharge current is alternating. Due to the fact that the magnitude of this current declines gradually, the alternating magnetizing force imposed on the magnetic circuit has the effect of reducing the magnetic remanence. Hence, upon cessation of the discharge, the workpiece can be lifted from the chuck.

Figure 4:
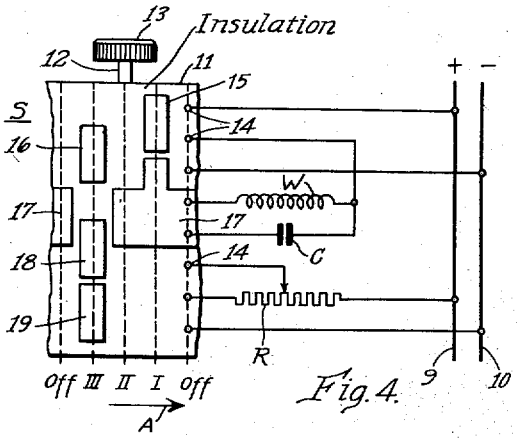
Fig. 4 shows diagrammatically another embodiment of a control circuit for chucks.

A control circuit as described in the foregoing is sufficient for smaller chucks. In order to obtain a sufficient demagnetization also in case of larger chucks and workpieces without requiring capacitors of extremely large rating, a repeated demagnetizing performance is preferably provided for. To this end, the control circuit may be designed as represented in Fig. 4. According to Fig. 4, the winding W and the capacitor C are connected to direct-current supply leads 9 and 10 through a multi-position control switch S. In the embodiment of Fig. 4, this control switch S is of the rotary type and has four positions. In order to facilitate explaining a full cycle of operation of the switch, its contact elements are illustrated in developed form, and one of its four positions, i. e. the "off" position, is shown twice. The control switch S has a body 11 of insulating material which is rotated by means of a shaft 12 and an operator-actuable handle 13. A number of stationary contact fingers, such as those denoted by 14, co-operate with contact segments 15 through 19 which are mounted on the rotatable body 11. The direction of motion is indicated by the arrow marked "A." A rheostat is denoted by R.

In the illustrated "off" position of the switch, the winding W is short-circuited by the capacitor C and disconnected from the leads 9 and 10 of a direct current line. The chuck is now in condition to receive a workpiece. Upon placing the workpiece on the chuck, switch S is turned to position I. In this position, lead 9 is connected through segment 15 with one terminal of winding W, while the other terminal of the winding is connected through segment 17 with lead 10. Consequently the chuck coils are now energized so that the workpiece is firmly attached to the chuck. The capacitor C remains connected across winding W by segment 17 and hence is charged. In order to release the workpiece, the switch S is turned into position II. This has the effect of disconnecting winding W from both leads 9 and 10, while the capacitor C remains connected across the winding. As a result, the capacitor passes a demagnetizing discharge current through the winding in the manner described above. Upon continuance of its rotation, switch S passes through its position III. In this position, the left-hand terminal of winding W remains disconnected so that the winding stays de-energized. The capacitor C, however, is now connected at one of its terminals to lead 10 through segment 16. The other terminal of the capacitor is connected through segment 18 to the slider of rheostat R. At the same time, the resistor of rheostat R is connected through segment 19 across leads 9 and 10. Consequently, the capacitor C is now charged from the line under a voltage determined by the setting of the rheostat, and this voltage is of opposite polarity as compared with that previously effective across the capacitor, and the voltage is so chosen by correspondingly positioning the rheostat slider that the subsequent discharge suffices to demagnetize the chuck to the extent needed for permitting the removal of the workpiece.

In the last position of switch S, which is identical with the "off" position, the capacitor C is again connected across winding W and both are disconnected from the line.

Figure 5:
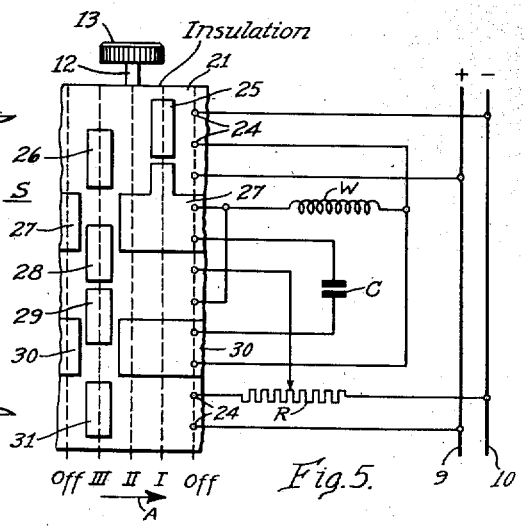
Fig. 5 is a similar circuit diagram representing a third embodiment of the invention.

The embodiment shown in Fig. 5 involves a further improvement over that of Fig. 4. The control circuit of winding W and capacitor C includes a rheostat R and a control switch S, as in the embodiment of Fig. 4. The switch S has its rotor 21 provided with seven segments denoted by numerals 25 through 31 for co-operation with stationary contact fingers such as those denoted by 24. The switch has four contact positions of which the "off" position is shown twice in the developed diagram. In the "off" position, winding W and capacitor C are connected in parallel through segments 27 and 30 and are both disconnected from the line. In position I, lead 10 is connected through segment 25 with one terminal of winding W, while the other terminal of the winding is connected through segment 27 with lead 9. The capacitor remains in parallel to winding W. Hence the chuck is now magnetized and the capacitor charged. In position II of the switch, winding W is disconnected from the line so that the capacitor passes a discharge current through the winding as in the previous embodiments. In the third position, lead 9 is connected through segment 26 to one end of winding W, while the other end of the winding is connected through segment 29 with one pole of the capacitor C. The other pole of the capacitor is connected through segment 28 with the slider of rheostat R. The rheostat R is connected across the line through segment 31. Consequently, in this third position, the capacitor is charged in accordance with the voltage setting of the rheostat R, but in contrast to the embodiment of Fig. 4, the recharging current passes also through the winding W. This current, however, is limited to the displacement current of the capacitor and its direction of flow in winding W is opposite to that of the original demagnetizing current. As a result, the recharging current of capacitor C performs also a demagnetizing effect. In the last position of switch S which is identical with the initial "off" position, the capacitor is again discharged through winding W. It will be noted, however, that this second discharge has a polarity opposite to the first discharge as typified by the voltage time curve F in Fig. 7. The discharge begins at the moment T2, and its first and largest magnitude is in the demagnetizing direction of the holding magnet.

It will be apparent from the above described examples that the use of a capacitive discharge current for producing a demagnetizing effect according to the invention involves the application of a metered or limited demagnetizing effect which secures a definite reduction in remanent magnetism each time it is applied to the magnet coils. Hence, the control means according to the invention eliminate the above-mentioned trial and error method, and permit obtaining a sufficient demagnetization without requiring any skill or timing in the actuation of the control switch, repeating the capacitive charging and discharging operation if necessary. Chucks for machine tools designed in accordance with Figs. 4 and 5 are usually sufficient to produce substantially total demagnetization by a single full-cycle operation of the control switch. Of course, if desired, the recharging and discharging steps corresponding to switch position III and "off" may be repeated.

Figure 8:
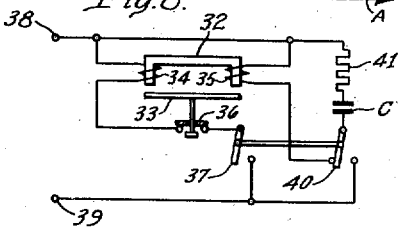
Fig. 8 is the circuit diagram of an electromagnetic relay having a retentive magnetic circuit provided with control means according to the principles of the invention.

The embodiment of a magnetically retentive contactor shown in Fig. 8 serves to exemplify the use of the invention for obtaining a timing effect. According to Fig. 8, the magnetic circuit of a relay formed by a stationary fieldpiece 32 and a movable armature 33 contains magnetically retentive material so that the armature 33 remains attracted and sealed against the fieldpiece 32 once the latter has been magnetized sufficiently. The fieldpiece 32 is provided with a magnetizing coil 34 and a demagnetizing coil 35. Coil 34 is connected through an interlock contact 36 and a control contact 37 between the direct-current terminals 38 and 39 of the relay circuit. A contact 40 permits connecting a capacitor C across the direct-current terminals in series with a current limiting resistor 41.

The armature 33 is provided with a main contact assembly (not illustrated) to be controlled by the relay. The interlock contact 36, which may form part of the main assembly, is closed when the armature is in the open position, and is interrupted when the armature is attracted by the fieldpiece and has moved through most of its travel toward the fieldpiece. The two contacts 37 and 40 are interconnected so that the contact 40 shifts from one to its other stationary connections when contact 37 is closed and opened.

In the condition shown in Fig. 8, the magnetic circuit of the relay is de-energized. When contact 37 is closed, coil 34 is energized so that sufficient magnetism is induced in fieldpiece 32 for attracting the armature 33. The armature moves upwardly and, near the end of its travel, interrupts the magnetizing circuit at contact 36. Although the energizing current is now interrupted, the armature 33 remains in picked-up position due to the residual magnetism of the magnetic circuit. At the same time, contact 40 connects capacitor C across terminals 38 and 39 so that the capacitor is charged through resistor 41. In order to release the relay, contact 37 is opened. This causes contact 40 to connect the capacitor C across coil 35. As a result a discharge current passes through the coil and demagnetizes the magnetic circuit until the residual magnetism becomes lower than is necessary for overcoming the armature bias. The armature will then drop off so that the relay system is in its original condition and ready for a new operation.

Figure 6:
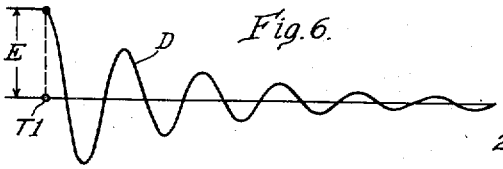
Figs. 6 and 7 are explanatory and show different current-time curves typical of the demagnetizing discharge current occurring in capacitive circuits according to the invention.
Figure 7:
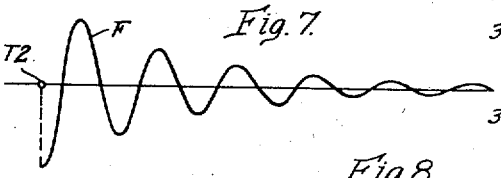

The demagnetizing current flowing in the oscillatory system of coil 35 and capacitor C reduces the retentive induction of the magnetic circuit during each second half cycle of an alternating magnetizing force occurring substantially in accordance with a curve of the type shown in Fig. 6 or 7. The effect of this stepwise demagnetization is cumulative and hence requires the occurrence of a multitude of alternating cycles before the relay drops off. In other words, the demagnetizing effect is not instantaneous but extends over a period of time which depends on the rating of the capacitive charge and the frequency and attenuation of the discharge current. A change in any of these determinants permits changing and adjusting the timing period of the relay.

As exemplified by the various embodiments described in the foregoing and as will be understood by those skilled in the art upon a study of this disclosure, control systems according to the principles of my invention may be modified and altered as to details without departing from the gist and scope of the invention as set forth in the claims attached hereto.

I claim as my invention:

1. [With a] *A* magnetic chuck having a [holding magnet,] *magnetizable member and* [the combination of] coil means inductively associated with said [magnet,] *member, in combination with* circuit means for energizing said coil means from a direct-current source, a capacitor, a selective control switch movable between at least three sequential positions and having three *respective* sets of contact [operative when said switch is in said respective three positions] *means,* a first one of said sets of [contacts being connected to] *contact means connecting* said coil means and said capacitor [and] *parallel to each other across* said circuit means so as to magnetize said magnet and charge said capacitor when said switch is in one of said positions [to substantially demagnetize the chuck when said switch is in the next position], a second one of said sets of [contacts] *contact means* connecting said coil means *only* across said capacitor for discharging said capacitor through said coil means *to substantially demagnetize the chuck when said switch is in the next position,* and the third set of [contacts being connected to] *contact means connecting* said circuit means [and] *only to* said capacitor for recharging said capacitor [while maintaining said coil means disconnected from said capacitor and said circuit means when said switch is in the third position].

2. With a magnetic chuck having a [holding magnet] *magnetizable member,* the combination of coil means inductively associated with said [magnet] *member,* circuit means for supplying energizing direct current to said coil means, a capacitor, a control switch disposed between said coil means, capacitor and circuit means and having at least four sequential positions and four sets of respective [contacts] *contact means* of which only one set is effective at a time depending upon the position of said switch, one of said sets of [contacts being connected to said circuit means and] *contact means connecting* said coil means and said capacitor *parallel to each other across said circuit means* to magnetize said [magnet] *member* and charge said capacitor when said switch is in the first position, each of the second and fourth sets of [contacts] *contact means* being attached only to said coil means and said capacitor and connecting said capacitor across said coil means for discharging said capacitor through said coil means to substantially demagnetize the chuck when said switch is in the second and fourth positions respectively, and the third set of [contacts] *contact means* connecting said capacitor only to said circuit means for recharging said capacitor when said switch is in the third position.

3. With a holding magnet, the combination of coil means inductively associated with said magnet, circuit means for supplying energizing direct current to said coil means, a capacitor for substantially demagnetizing said magnet by discharging through said coil means, a control switch having at least three positions and three respective sets of [contacts] *contact means* of which only one set is effective at a time depending upon the position of said switch, a first one of said sets of [contacts] *contact means* connecting said circuit means [to] *across* said coil means and *across* said capacitor to magnetize said magnet and charge said capacitor by voltage of one polarity when said switch is in one position, a second one of said sets of [contacts being connected only to] *contact means connecting* said coil means [and] *across* said capacitor for discharging said capacitor through said coil means when said switch is in another position, and the third set of [contacts] *contact means* connecting said circuit means only to said capacitor and having reversed polarity of connection as compared with said first set [of contacts] so as to charge said capacitor by voltage of opposite polarity when said switch is in the third position.

4. With a magnetic chuck having a [holding magnet] *magnetizable member,* the combination of coil means inductively associated with said [magnet] *member,* circuit means for energizing said coil means from a direct-current source, a capacitor, a potentiometric rheostat, and control means having a selector switch with at least three selective positions, said switch having three sets of [contacts] *contact means* of which only one set is effective at a time depending upon the position of said switch, one of said sets of [contacts] *contact means* connecting said [circuit means to said] coil means and said capacitor *parallel to each other across said circuit means* to magnetize said [magnet] *member* and charge said capacitor when said switch is in one of said positions, another one of said sets of [contacts] *contact means* connecting said coil means across said capacitor for discharging said capacitor through said coil means when said switch is in another position to substantially demagnetize said [magnet] *member,* and the third set of [contacts] *contact means* connecting said circuit means to said rheostat and said capacitor so as to recharge said capacitor through said rheostat when said switch is in the third position.

*5. Magnetic-chuck control means, comprising terminals for connection to a chuck coil, direct-current supply means for energizing said terminals, a capacitor, a selective control switch having at least three sequential positions and having three sets of contact means operative when said switch is in said respective three positions, a first one of said sets of contact means connecting said terminals and said capacitor in parallel relation across said current supply means so as to energize said terminals and charge said capacitor from said supply means when said switch is in one of said positions, a second one of said sets of contact means connecting said terminals only across said capacitor for discharging said capacitor, and the third set of contact means connecting said supply means to said capacitor for recharging said capacitor, at least one of said terminals being disconnected from said capacitor and from said supply means when said switch is in the third position.*

*6. Magnetic-chuck control means, comprising terminals for connection to a chuck coil, direct-current supply means for energizing said terminals, a capacitor, a control switch having at least three positions and three respective sets of contact means of which only one set is effective at a time depending upon the position of said switch, a first one of said sets of contact means connecting said terminals and said capacitor in parallel relation across said current supply means*

*to energize said terminals and charge said capacitor by voltage of one polarity when said switch is in one position, a second one of said sets of contact means connecting said terminals only across said capacitor for discharging said capacitor through said terminals when said switch is in another position, and the third set of contact means connecting said current supply means only to said capacitor and having reversed polarity of connection as compared with said first set of contact means so as to charge said capacitor by voltage of opposite polarity when said switch is in the third position.*

FREDERICK D. SNYDER.

REFERENCES CITED

The following references are of record in the file of this patent or the original patent:

UNITED STATES PATENTS

| Number | Name | Date |
|---|---|---|
| 2,138,864 | Karasick | Dec. 6, 1938 |
| 2,213,007 | Karasick | Aug. 27, 1940 |
| 2,240,749 | Beechlyn | May 6, 1941 |
| 2,347,369 | Roters | Apr. 25, 1944 |